(12) United States Patent
Ullrich et al.

(10) Patent No.: US 6,511,517 B1
(45) Date of Patent: Jan. 28, 2003

(54) METHOD FOR PRODUCING A SECONDARY LITHIUM CELL COMPRISING A HEAT-SENSITIVE PROTECTIVE MECHANISM

(75) Inventors: Matthias Ullrich, Kelkheim; Dieter Bechtold, Bad Vilbel; Heinrich Rabenstein, Frankfurt; Thomas Brohm, Kelkheim, all of (DE)

(73) Assignee: NBT GmbH (DE)

( * ) Notice: Subject to any disclaimer, the term of this patent is extended or adjusted under 35 U.S.C. 154(b) by 0 days.

(21) Appl. No.: 09/551,132

(22) Filed: Apr. 17, 2000

(30) Foreign Application Priority Data

Apr. 22, 1999 (DE) .......................................... 199 18 109

(51) Int. Cl.⁷ .............................................. H01M 10/38
(52) U.S. Cl. ...................................... 29/623.5; 29/623.1
(58) Field of Search ............................... 29/623.1, 623.5

(56) References Cited

U.S. PATENT DOCUMENTS

| 4,075,400 A | 2/1978 | Fritts |
| 4,650,730 A | 3/1987 | Lundquist et al. |
| 4,731,304 A | 3/1988 | Lundquist |
| 4,741,979 A | * 5/1988 | Faust et al. ................. 429/144 |
| 5,091,272 A | * 2/1992 | Treger ........................... 429/62 |
| 5,591,542 A | 1/1997 | Sakamoto et al. |
| 5,837,015 A | 11/1998 | Venugopal et al. |

FOREIGN PATENT DOCUMENTS

| EP | 0 634 802 | 1/1995 |
| GB | 1 148 852 | 4/1969 |
| JP | 6000052 | 1/1985 |
| JP | 7-130349 | * 5/1995 |

* cited by examiner

Primary Examiner—John S. Maples
(74) Attorney, Agent, or Firm—Schnader Harrison Segal & Lewis LLP

(57) ABSTRACT

A method for producing a secondary lithium cell which has at least one lithium-cycling negative electrode, at least one lithium-intercalating positive electrode, at least one separator disposed between the positive and the negative electrode, and a nonaqueous lithium ion-conducting electrolyte. The method is carried out by the electrodes and/or the separator being coated, by means of electrostatic powder coating, with wax particles which are insoluble in the electrolyte and have a melting temperature of from about 50 to about 150° C. and a mean particle size of from about 6 to about 20 $\mu$m, the amount of wax being between about 0.5 and about 2.5 mg/cm$^2$ of electrode area.

20 Claims, 5 Drawing Sheets

METHOD FOR PRODUCING A SECONDARY LITHIUM CELL COMPRISING A HEAT-SENSITIVE PROTECTIVE MECHANISM

The Government of the United States of America has rights in this invention pursuant to Cooperative Agreement No. DE-F CO2-91CE 50336 awarded by the U.S. Department of Energy.

FIELD OF THE INVENTION

The invention relates to a method for producing a secondary lithium cell which has at least one carbon-containing negative electrode, at least one lithium-intercalating positive electrode, at least one separator disposed between the positive and the negative electrode, and a nonaqueous lithium ion-conducting electrolyte.

BACKGROUND

Electrochemical cells having a high energy storage capacity use safety precautions which, e.g. in the case of short circuits, provide protection against spontaneous release of energy stored therein. To this end, it has previously been proposed to integrate a heat-sensitive protective mechanism into lithium ion cells which is designed, beyond a predefined cell temperature, to block or at least significantly limit the ion flow in the cell.

U.S. Pat. No. 4,075,400 discloses a separator which includes an agent that poisons the electrochemical cell reaction, is embedded into a temperature-sensitive material and released beyond a predefined temperature.

U.S. Pat. Nos. 4,650,730 and 4,73 1,304 disclose separators comprising two microporous layers having different melting points. When the melting point of the low-melting material is reached, the latter loses its porous structure and, thus, reduces ion flow in the cell.

U.S. Pat. No. 4,741,979 describes a separator which is made of wax-coated fibers. The wax is designed to melt beyond a predefined temperature and seal the pores between the fibers.

U.S. Pat. No. 5,091,272 further discloses a separator for electrochemical cells, which involves polymer particles having a predefined melting temperature being applied to the separator. The application of the polymer particles according to '272 takes place from a dispersion of the polymer particles in a low-boiling solvent. Particles having a size of from about 1 to 15 $\mu$m are applied to the separator in layer thicknesses of about 25 $\mu$m with the aid of binders. The application from a low-boiling solvent does, for environmental reasons, require complicated equipment to remove the solvent vapors from the waste air, and the binders remaining in the cell may adversely affect the electrochemical reactions of the cell.

OBJECTS OF THE INVENTION

It is an object of the invention to specify a method which simplifies the production of electrochemical cells having a heat-sensitive protective mechanism, does not lead to the introduction of materials which, during normal operation, affect the electrochemistry, and shortens the response times to activate the interruption in the ion flow in the electrochemical cell.

SUMMARY OF THE INVENTION

The invention relates to lithium ion batteries having carbon-containing negative electrodes.

The invention particularly relates to a method for producing a secondary lithium cell having a heat-sensitive protective mechanism in such a way that the electrodes and/or the separator are coated, by means of electrostatic powder coating, with wax particles which are insoluble in the electrolyte, have a melting temperature of from about 50 to about 150° C. and a mean particle size of from about 6 to about 20 $\mu$m, the amount of wax being between about 0.5 and about 2.5 mg/cm² of electrode area.

Figure 1:
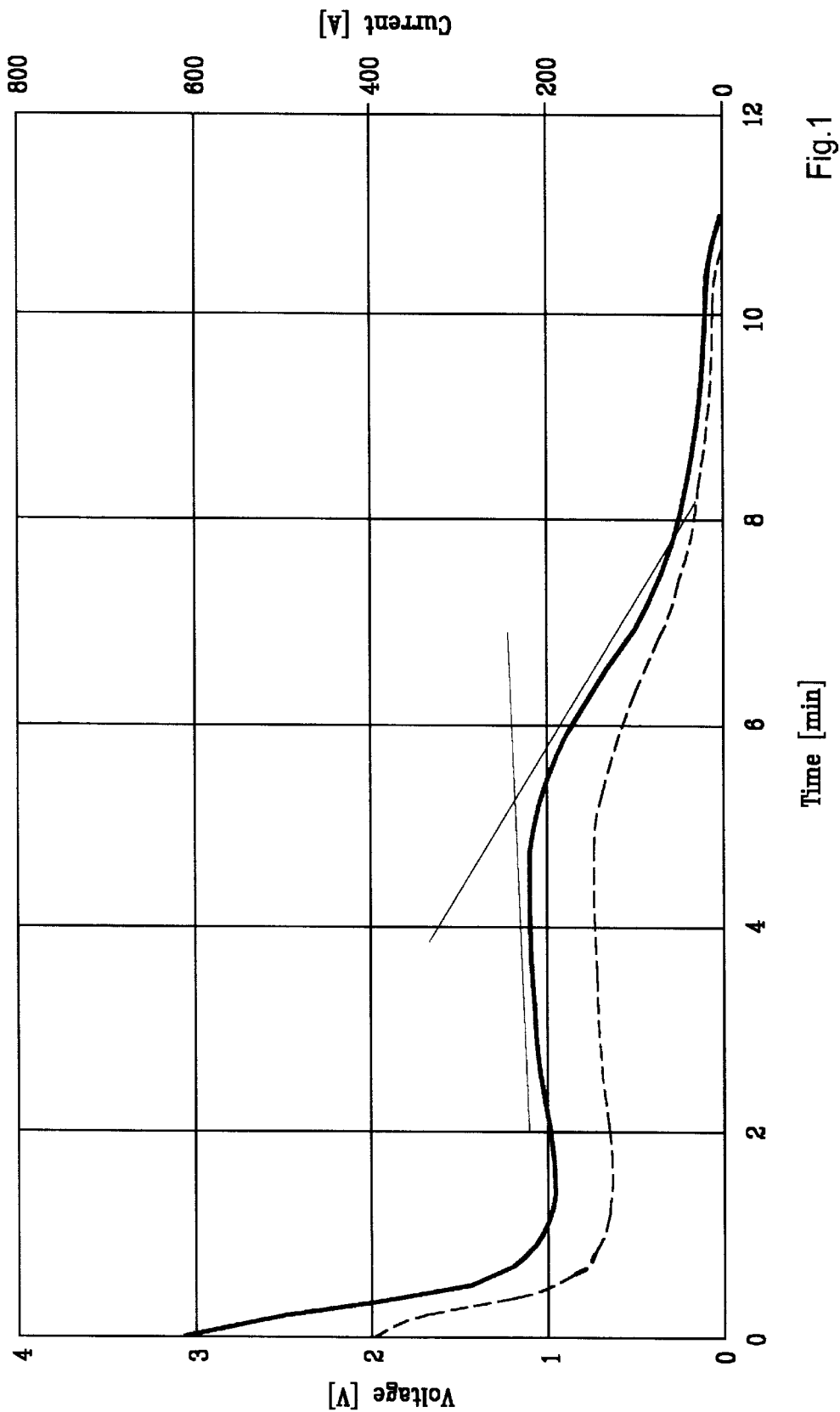
FIG. 1 is a graph showing current (continuous line) and voltage (dashed line) during an external short circuit on a prismatic 60 Ah lithium ion cell having a commercial shutdown separator (Celgard 2300, Hoechst Celanese Corp.).

The invention is explained below in more detail with reference to an example and two comparative examples.

DETAILED DESCRIPTION OF THE INVENTION

The invention particularly relates to a method for producing a secondary lithium cell having a heat-sensitive protective mechanism in such a way that the electrodes and/or the separator are coated, by means of electrostatic powder coating, with wax particles which are insoluble in the electrolyte, have a melting temperature of from about 50 to about 150° C. and a mean particle size of from about 6 to about 20 $\mu$m, the amount of wax being between about 0.5 and about 2.5 mg/cm² of electrode area.

The method according to the invention, in a simple manner, allows the surface of the electrodes and/or the separator to be coated with wax particles without the porosity, required for ion transport, of the electrodes and/or the separator being appreciably restricted.

Advantageously, waxes are used which consist of a mixture of waxes having different melting points, the low-melting fraction of the waxes advantageously having a melting temperature in the range of from about 60 to about 90° C.

The wax particles applied according to the invention are sintered onto the surface of the electrodes and/or the separator preferably by storage at the softening temperature of the low-melting fraction.

The waxes used are preferably polyolefin waxes, in particular, polyethylene waxes.

The cells obtained according to the invention are unaffected in terms of their electrochemistry, due to an additional binder being dispensed with, and exhibit a curtailed response behavior and an improvement of the temperature limitation in the event of an internal or external short circuit, compared with known cells having a separator comprising a plurality of polypropylene and polyethylene layers. Compared with cells having separators comprising a wax layer applied from solvents, the cells produced by the method according to the invention have a distinctly improved cyclic service life.

INVENTION EXAMPLE

To apply wax particles, negative electrodes were suspended to provide metallic conductance and brought into contact with a terminal of a DC voltage source of a powder coating facility.

The applied powdered wax, which starts to soften at about 88° C. and has a melting point, as specified by the manufacturer, of about 113° C. was substantially homogeneously mixed (fluidized) in this facility with a pressurized gas (preferably compressed air) and sprayed onto the electrodes via a spray gun. The spray gun was connected to the other terminal of the DC voltage source and, thus, caused the powder particles to be electrostatically charged. The voltage difference of, in general, from about 30 kV to about 100 kV ensured that the powder particles were directionally carried to the electrodes and readily adhered thereto.

To allow the electrodes to be handled during processing without the powder layer being destroyed, the freshly coated electrodes were treated in a sintering furnace for about 10 minutes at a temperature of about 90° C.

Figure 4:
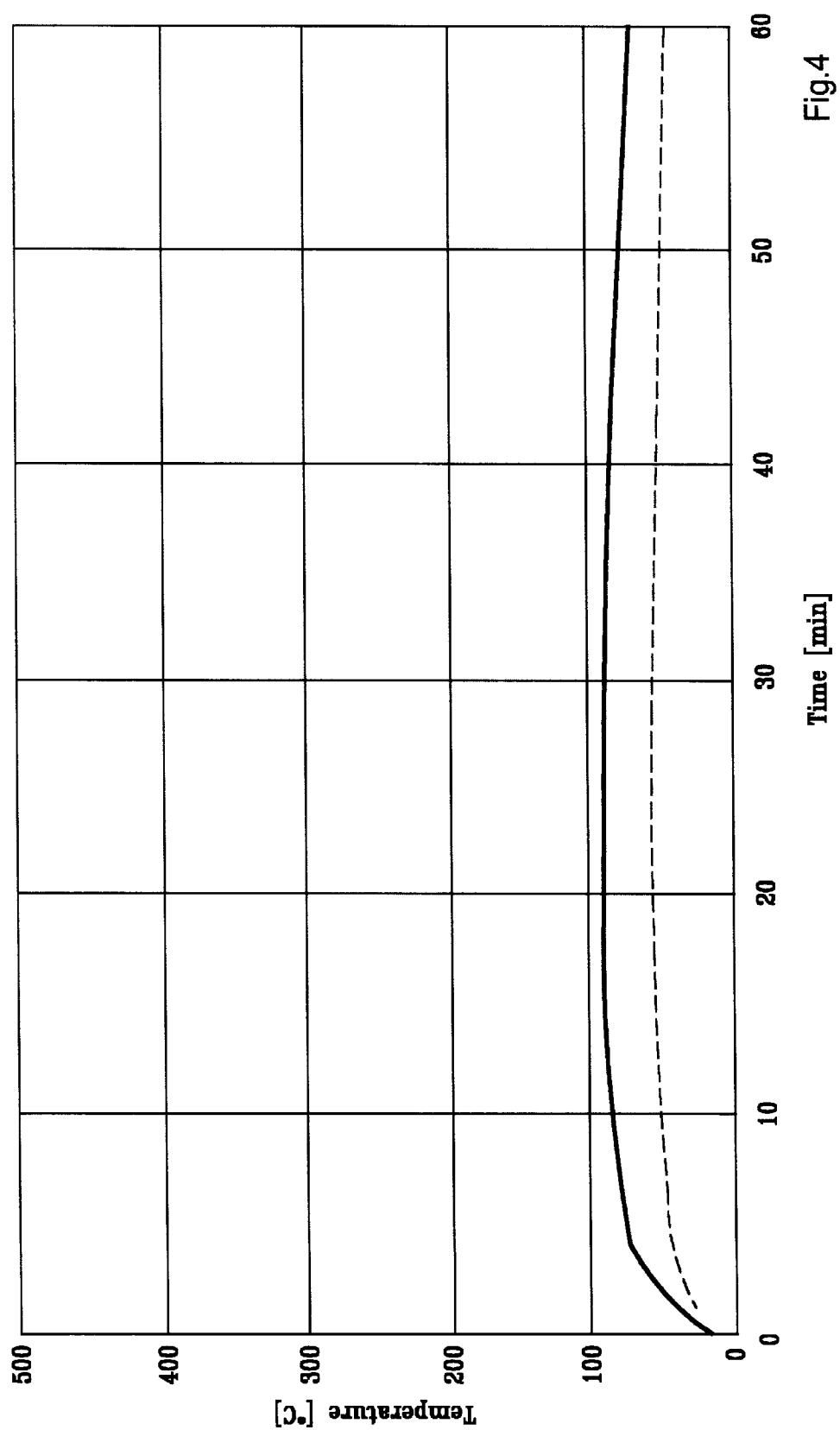
FIG. 4 is a graph showing the temperature at the cell jacket (continuous line) and at the negative terminal of the cell (dashed line) during an external short circuit on a prismatic 60 Ah lithium ion cell having wax-coated electrodes and a commercial separator (Celgard 2502, Hoechst Celanese).
Figure 5:
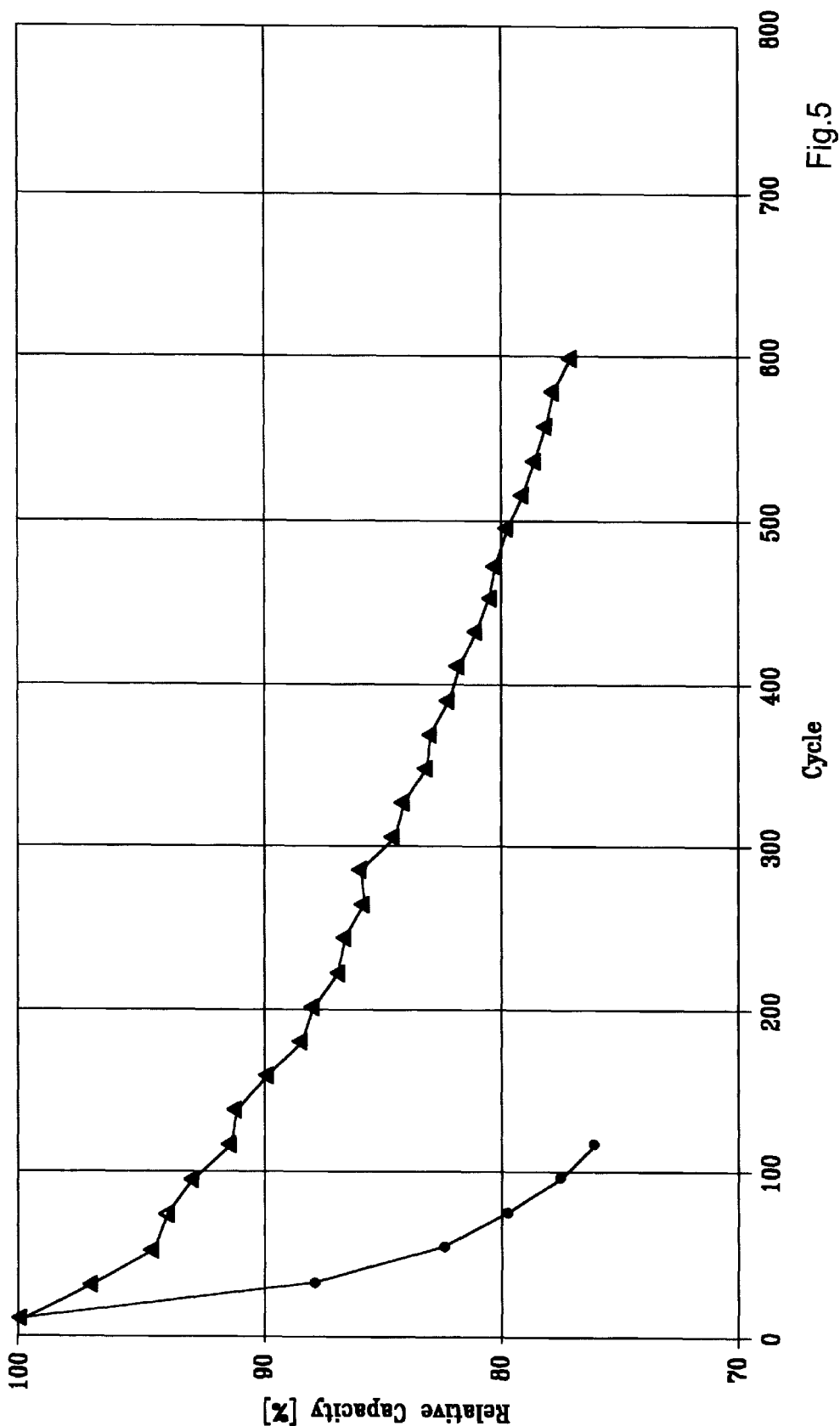
FIG. 5 is a graph showing a comparison of the cyclic service life of a prismatic 60 Ah lithium ion cell having electrodes coated with wax according to the invention and a commercial separator (-Δ-) and prismatic 60 Ah lithium ion cells comprising a separator which was coated with a binder-containing wax in a solvent (-●-)

In service life tests on a plurality of cells it was proven that the wax coating did not adversely affect the service life of the cell as shown in FIG. 5. In the safety test (external short circuit of a charged cell), the coating prevented opening of the cell and thermal escalation as shown in FIG. 4.

Comparative Example 1

A cell of the same type was fabricated using electrodes without wax, two layers of a commercial polypropylene/polyethylene/polypropylene (PP/PE/PP) shutdown foil separator (Celgard 2300, Hoechst Celanese Corp.) being used to electrically insulate the electrodes from one another. Both cells exhibited virtually identical behavior and performance in normal operation. To check the functionality of the shutdown mechanism, a safety test was carried out with both cells. This involved the cell, charged to 100%, being subjected to a low-resistant external short circuit over a period of 90 minutes, the external short-circuit resistance being smaller than or equal to the internal cell resistance.

As FIG. 1 shows, the shutdown effect occurred after about 5 minutes in the case of the cell having the commercial shutdown separator.

Figure 2:
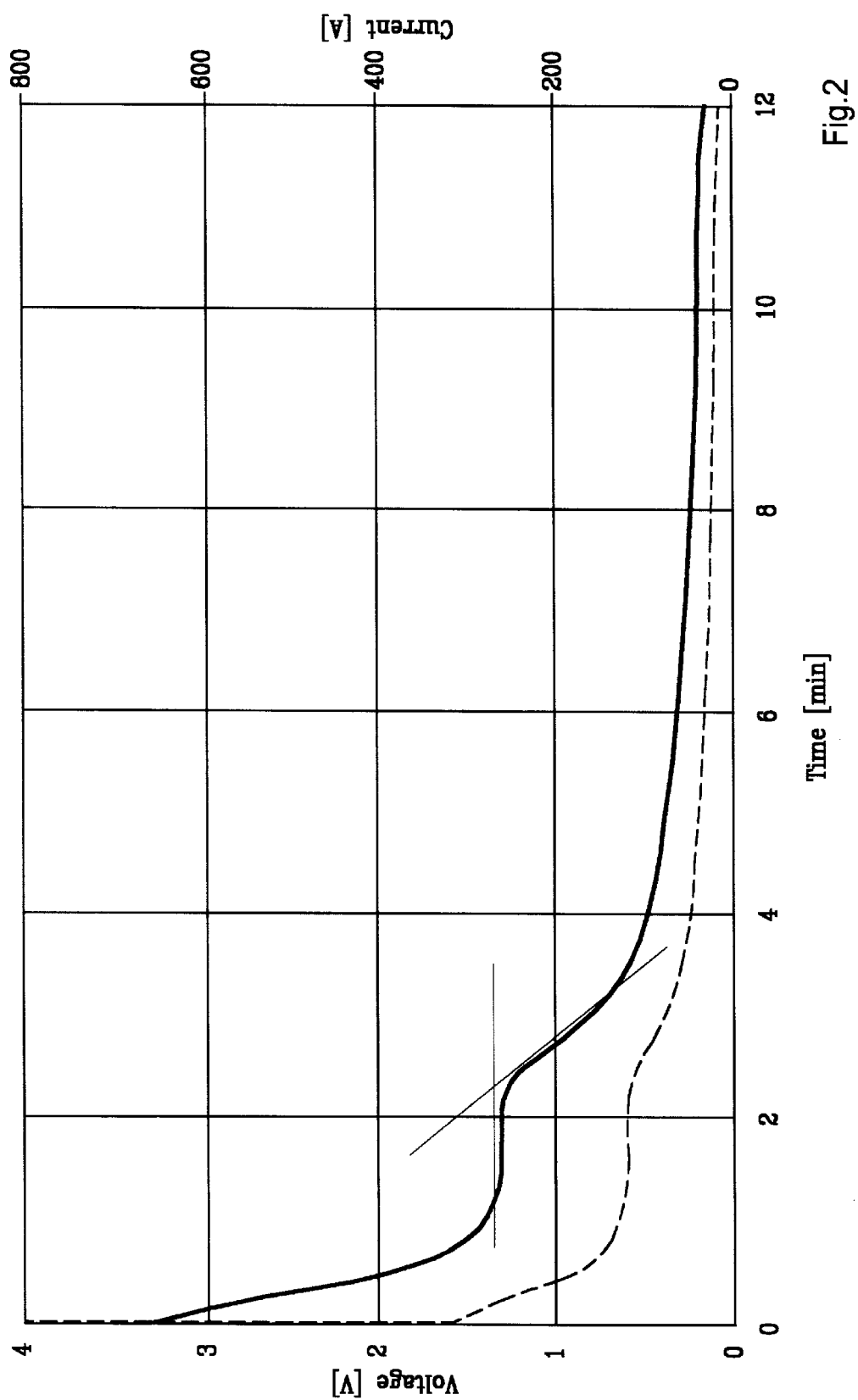
FIG. 2 is a graph showing current (continuous line) and voltage (dashed line) during an external short circuit on a prismatic 60 Ah lithium ion cell having electrodes coated with wax according to the invention and a commercial separator (Celgard 2502, Hoechst Celanese).

In the case of the cell having the electrodes coated according to the invention, the shutdown effect occurred after only about 2 minutes, as shown in FIG. 2.

The shutdown rate in the case of the cell having the commercial shutdown separator is 32% per minute, based on the current level at the onset of shutdown.

The shutdown rate in the case of the cell having the electrodes coated with wax according to the invention is 61% per minute, based on the current level at the onset of shutdown.

Figure 3:
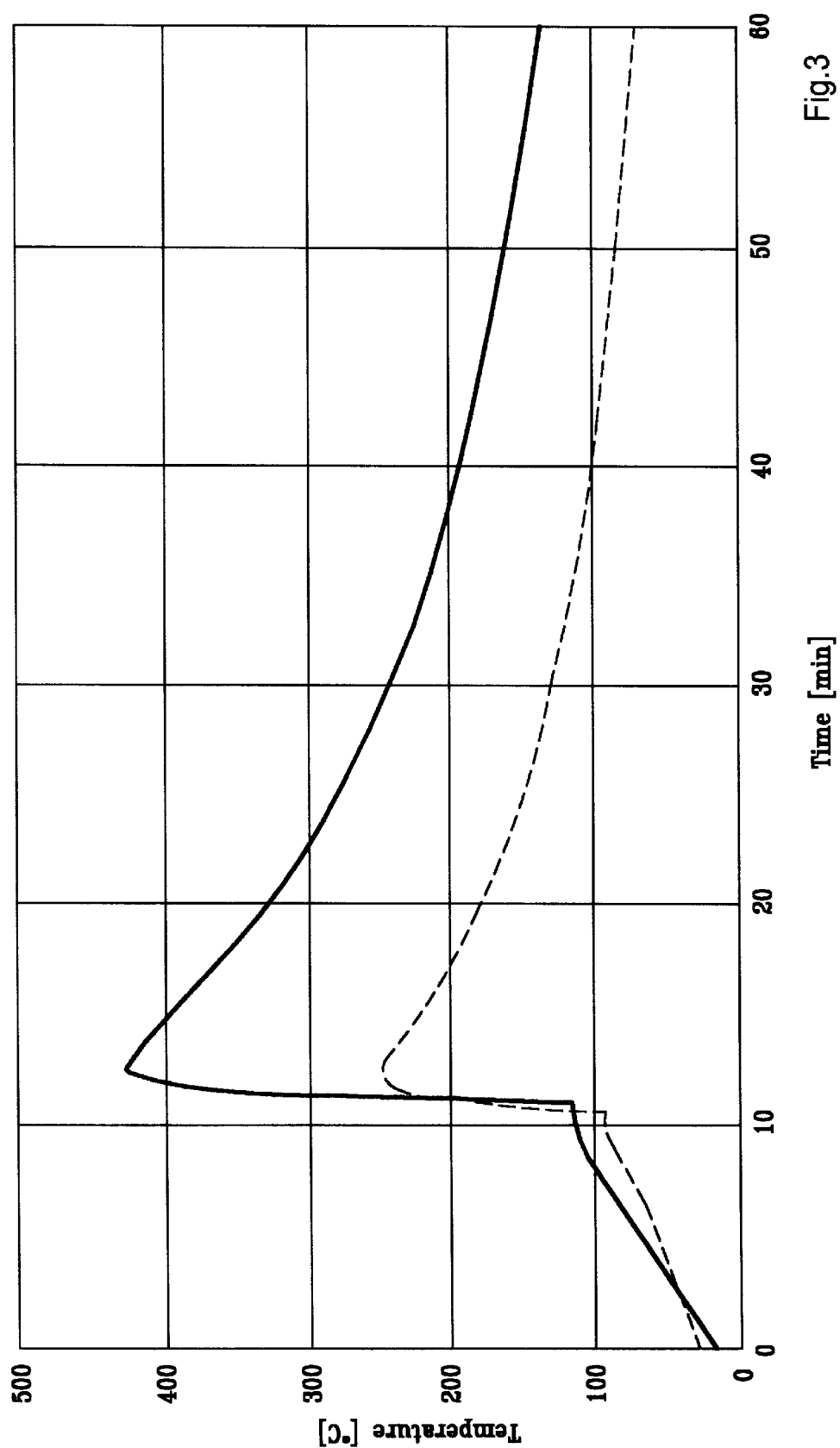
FIG. 3 is a graph showing the temperature at the cell jacket (continuous line) and at the negative terminal of the cell (dashed line) during an external short circuit on a prismatic 60 Ah lithium ion cell having a commercial shutdown separator (Celgard 2300, Hoechst Celanese Corp.).

After about 11 minutes, in the case of the cell having the commercial shutdown separator, spontaneous release of electrical energy commenced, as shown by FIG. 3, characterized by the slump in the current (continuous line) and voltage (dashed line).

In the case of the cell having the electrodes coated with wax according to the invention, no spontaneous release of the electrical energy occurred up to the end of the trial (90 minutes), as shown by FIG. 4.

The spontaneous release of the electrical energy in the case of the cell having the commercial shutdown separator lead to temperatures on the surface of the cell jacket of more than 400° C., as shown by FIG. 3. The safety valve of the cell opened and allowed electrolyte vapors and reaction products to escape.

The cell having the electrodes coated with wax according to the invention heats up to at most 90° C. in the course of the trial (FIG. 4). Opening the safety valve and venting of cell contents is thereby prevented.

Comparative Example 2

A cell of the same type was fabricated with a wax-coated separator. To this end, a commercially available polypropylene separator was dipped into a solution of 30 g of an acrylate binder (Gelva—2480 from Monsanto), 180 g of polyethylene wax (polywax—655 T10 from Petrolite) in a solvent mixture of 760 g of acetone and 40 g of ethanol, so that about 1.0 mg/cm$^2$ of separator area was applied. Whereas the comparative cell, according to Comparative Example 2, only has a cyclic service life of about 80 cycles up to a relative capacity of 80%, the cell according to the invention, as shown by FIG. 5, manages about 480 full cycles until the relative capacity drops to 80% of the initial capacity.

Although this invention has been described with reference to specific components and method steps, it will be apparent to one of ordinary skill in the art that various equivalents may be substituted. The sequence of steps may be varied, and certain steps may be used independently of others, all without departing from the spirit and scope of the invention defined in the appended claims.

What is claimed is:

1. A method for producing a secondary lithium cell which has at least one lithium-cycling negative electrode, at least one lithium-intercalating positive electrode, at least one separator disposed between the positive and the negative electrode, and a nonaqueous lithium ion-conducting electrolyte, comprising:

electrostatically spray powder coating the electrodes and/or the separator with wax particles which are insoluble in the electrolyte and have a melting temperature of from about 50 to about 150° C. and a mean particle size of from about 6 to about 20 µm, the amount of wax being between about 0.5 and about 2.5 mg/cm$^2$ of electrode and/or separator area.

2. The method as claimed in claim 1, wherein the electrolyte-insoluble wax is a mixture of waxes, a low-melting fraction of which has a melting temperature of from 60 to 90° C.

3. The method as claimed in claim 1, wherein the wax particles are secured onto the surfaces of the electrodes and/or the separator by storage at the softening temperature of the low-melting fraction.

4. The method as claimed in claim 1, wherein the electrolyte-insoluble wax is a polyolefin wax.

5. The method as claimed in claim 4, wherein the polyolefin wax used is a polyethylene wax.

6. The method as claimed in claim 2, wherein the wax particles are secured onto the surfaces of the electrodes and/or the separator by storage at the softening temperature of the low-melting fraction.

7. The method as claimed in claim 2, wherein the electrolyte-insoluble wax is a polyolefin wax.

8. The method as claimed in claim 3, wherein the electrolyte-insoluble wax is a polyolefin wax.

9. The method as claimed in claim 7, wherein the polyolefin wax used is a polyethylene wax.

10. The method as claimed in claim 8, wherein the polyolefin wax used is a polyethylene wax.

11. A method of producing a secondary lithium cell comprising:

electrostatically spray powder coating at least one cell component selected from the group consisting of lithium-cycling negative electrode(s), lithium-intercalating positive electrode(s) and separator(s) with wax particles which are insoluble in an electrolyte and have a melting temperature of from about 50 to about 150° C. and a mean particle size of from about 6 to about 20 $\mu$m, the amount of wax being between about 0.5 and about 2.5 mg/cm$^2$ of electrode and/or separator area; and assembling said electrodes and said separator(s).

12. The method as claimed in claim 11 further comprising adding a nonaqueous lithium ion-conducting electrolyte to said cell.

13. The method as claimed in claim 11, wherein the electrolyte-insoluble wax is a mixture of waxes, a low-melting fraction of which has a melting temperature of from 60 to 90° C.

14. The method as claimed in claim 11, wherein the wax particles are secured onto the surfaces of the electrodes and/or the separator by storage at the softening temperature of the low-melting fraction.

15. The method as claimed in claim 11, wherein the electrolyte-insoluble wax is a polyolefin wax.

16. The method as claimed in claim 15, wherein the polyolefin wax used is a polyethylene wax.

17. A method of producing a secondary lithium cell comprising:

electrostatic powder coating all of at least one lithium-cycling negative electrode, at least one lithium-intercalating positive electrode and at least one separator with wax particles which are insoluble in an electrolyte and have a melting temperature of from about 50 to about 150° C. and a mean particle size of from about 6 to about 20 $\mu$m, the amount of wax being between about 0.5 and about 2.5 mg/cm$^2$ of electrode and/or separator area; and assembling said electrodes and said at least one separator.

18. The method as claimed in claim 17 further comprising adding nonaqueous lithium ion-conducting electrolyte to said cell.

19. A method for producing a secondary lithium cell which has a plurality of component parts comprising at least one lithium-cycling negative electrode, at least one lithium-intercalating positive electrode, at least one separator disposed between the positive and the negative electrode, and a nonaqueous lithium ion-conducting electrolyte, said method comprising the steps of:

electrostatically charging at least one of said electrodes;

spray powder coating said charged electrode with wax particles which are insoluble in the electrolyte and have a melting temperature of from about 50 to about 150° C. and a mean particle size of from about 6 to about 20 $\mu$m, the amount of wax being between about 0.5 and about 2.5 mg/cm$^2$ of electrode and/or separator area.

20. The method of claim 19 wherein, prior to spray powder coating, the method further includes the step of:

electrostatically charging a particle sprayer such that sprayed particles are oppositely charged from the charged electrode, and wherein said sprayer is used during spray powder coating.

* * * * *